Jan. 16, 1934. G. TÖPFER 1,943,704
STEERING WHEEL LOCK
Filed Dec. 13, 1932
Fig. 1
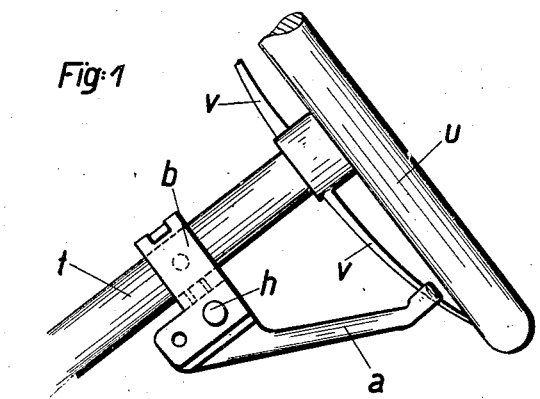
Fig. 2
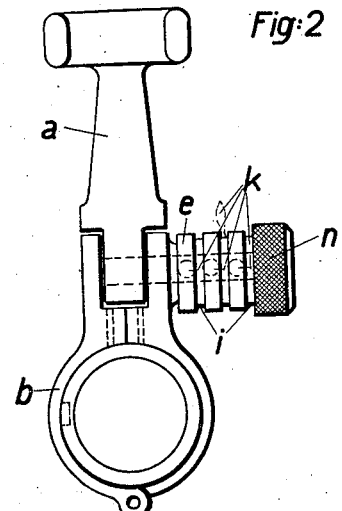
Fig. 3
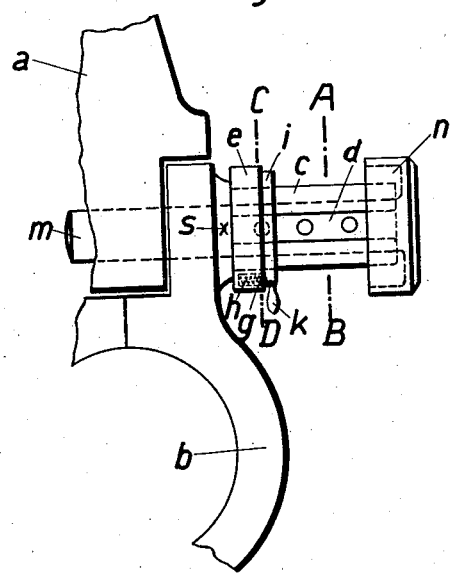
Fig. 4
Fig. 5
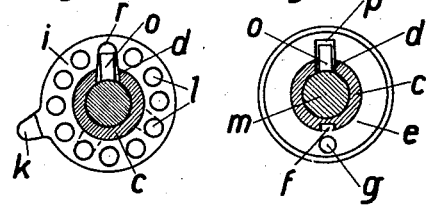
Fig. 6
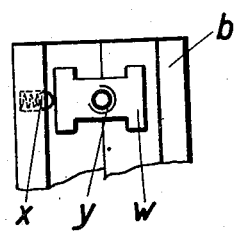
Fig. 7
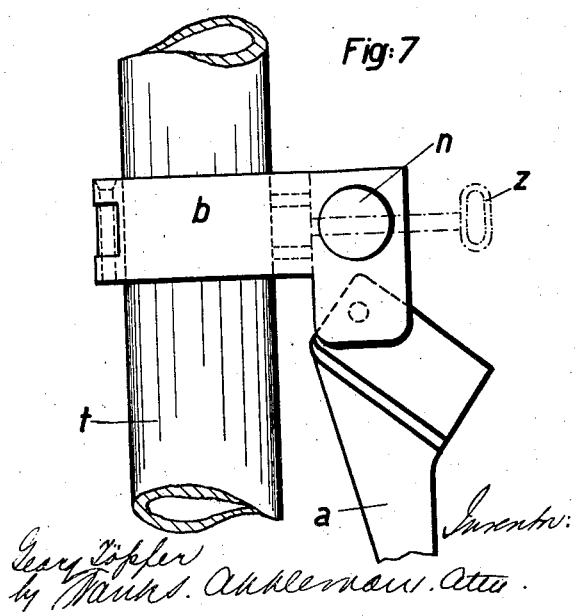

Patented Jan. 16, 1934

1,943,704

UNITED STATES PATENT OFFICE 1,943,704

STEERING WHEEL LOCK

Georg Töpfer, Munich, Germany

Application December 13, 1932, Serial No. 647,019, and in Germany December 15, 1931

4 Claims. (Cl. 70—129)

Applications have been filed in Germany December 15, 1931, and September 13, 1932.

The present invention refers to a cipher safety lock for locking motor car steering wheels, for instance, through the medium of a fork adapted to engage with one of the spokes of the steering wheel. The setting of a letter or cipher lock to the correct combination presents no difficulties in daylight, but at night this can only be done with certainty if the lock is well illuminated, which, however, is very often not the case, the result being loss of time and annoyance in consequence of false combinations.

The present invention eliminates the above disadvantage by providing the cipher wheels or discs with notches or holes so that these wheels or discs can be set by touch, even in the dark, thereby rendering the manipulation of the lock independent of artificial light.

Reference being had to the accompanying drawing, which shows one form of execution of the present invention, Fig. 1 is a view of a steering wheel with the safety lock in the locked position, Fig. 2 a front view seen in the line of the steering wheel axis, and Fig. 3 shows details on a larger scale. Figs. 4 and 5 are sections along the lines A—B and C—D respectively in Fig. 3, and Figs. 6 and 7 show further details.

In Fig. 1, $t$ is the steering pillar of the steering wheel $u$ with the spokes $v$, one of which can be engaged and locked in position by the swivel fork $a$ removably attached to the steering pillar by means of a suitable clamp $b$.

A sleeve $c$ with a longitudinal slit $d$ (Fig. 3) is arranged on the one arm of clamp $b$ and serves as carrier for the rings $e$, of which at least two, or better three or four, are provided. Each ring $e$ possesses an internal projection $f$ (Fig. 5) engaging in a corresponding groove of the sleeve $c$, thus preventing rotation of the rings on sleeve $c$. Adjustable thin discs or wheels $i$ are arranged between the rings $e$ on sleeve $c$ and can be rotated about said sleeve with the help of small handles $k$. Each of these discs $i$ possesses holes $l$, preferably 10 to 12 in number, adapted to engage with the spring pressed balls $g$. When the discs $i$ are turned, the balls $g$ will snap into holes $l$, thereby providing a means for setting the lock by touch alone.

The lock bolt $m$, provided with a knob $n$, slides into sleeve $c$, and is adapted to lock the fork $a$ in position. This bolt $m$ is provided with a separate projection or pin $o$ for each disc $i$, said pins sliding in the longitudinal slit $d$ of the sleeve. Each fixed ring $e$ is provided with an aperture $p$ sufficiently large to permit the pins $o$ to pass through (Fig. 5). Pins $o$ are made so long that they project into these apertures $p$, which therefore form a radial continuation of the sleeve slit $d$. One of the holes $l$ of each setting disc $i$ is extended inwards, thus forming a gap $r$ (Fig. 4). These gaps $r$ are large enough to permit the pins $o$ to pass through. As shown by the dotted lines in Fig. 4, these gaps $r$ are arranged at different points of the circumference of each disc $i$. A mark $s$ on the arm of clamp $b$ serves to denote the zero position of the lock and the setting of discs $i$.

As shown in Fig. 6, the clamp $b$ is held together by a key $w$ arranged on the inside of the clamp arms. This arrangement leaves more space for the attachment of the lock proper than was heretofore the case with the ordinary clamps, in which the clamp arms were pressed together by a screw bolt or the like passing right through the arms.

Key $w$ may also be secured in position by a spring pressed ball $x$ arranged on one side. The key $w$ can be pulled out with the help of a handle $z$ provided at its end with a screw thread screwing into a female screw $y$ in the key.

For each lock a certain combination is prescribed and the lock will function only when adjusted to this combination. For instance: the first disc $i$ is moved one notch or hole forwards from the zero position, the second disc four notches backwards, and the third disc five notches backwards. When this has been done, the gaps $r$ of the discs $i$ will correspond with the grooves $p$ of the fixed rings $e$, so that bolt $m$ can be pushed either in or out of sleeve $c$. But if now one or more of the discs $i$ is shifted, even only to the extent of one notch, then bolt $m$ is locked in position and with it also the swivel arm or fork $a$, and the lock can then be neither opened or closed until the proper combination is again adjusted.

As already mentioned, the notches permit the manipulation of the lock by touch even in the dark, it being only necessary to shift the discs the requisite number of notches from the zero position.

What I claim as my invention and desire to secure by Letters Patent, is:

1. In a steering wheel lock, a steering post clamp including a pair of post engaging members hinged together to open and close about a steering post, the free ends of said members having opposed undercut slots coacting to form a keyway when the members are closed on the post, and a key fitting said slots and holding the members closed.

2. In a steering wheel lock, a steering post clamp including a pair of post engaging members hinged together to open and close about a steering post, the free ends of said members having opposed undercut slots coacting to form a keyway when the members are closed on the post, a key fitting said slots and holding the members closed, fork arms extending from said members on opposite sides of the keyway, a wheel arm engaging fork pivoted between said fork arms and movable to cover and uncover the key, and locking means for securing the fork in wheel arm engaging position covering the key.

3. In a steering wheel lock, a steering post clamp including a pair of post engaging members hinged together to open and close about a steering post, the free ends of said members having opposed undercut slots coacting to form a keyway when the members are closed on the post, a key fitting said slots and holding the members closed, fork arms extending from said members on opposite sides of the keyway, a wheel arm engaging fork pivoted between said fork arms and movable to cover and uncover the key, a locking pin removably extending through one of the fork arms and into the fork in spaced relation to its pivot to hold the fork in key covering and wheel arm engaging position, and means to lock the pin releasably in locking position.

4. In a steering wheel lock, a steering post clamp including a pair of post engaging members hinged together to open and close about a steering post, the free ends of said members having opposed undercut slots coacting to form a keyway when the members are closed on the post, a key fitting said slots and holding the members closed, fork arm extending from said members on opposite sides of the keyway, a wheel arm engaging fork pivoted between said fork arms and movable to cover and uncover the key, a locking pin removably extending through one of the fork arms and into the fork in spaced relation to its pivot to hold the fork in key covering and wheel arm engaging position, a slotted sleeve projecting from the last mentioned fork arm and through which said pin passes, lugs on said pin projecting through and moving in the slot of the sleeve, and permutation rings rotatably mounted on the sleeve and having internal notches rotatably movable into and out of registry with the slot in said sleeve.

GEORG TÖPFER.